US012760233B2

(12) United States Patent
Shimizu et al.

(10) Patent No.: US 12,760,233 B2
(45) Date of Patent: Oct. 13, 2026

(54) GASIFICATION SYSTEM AND WASTEWATER TREATMENT METHOD

(71) Applicant: SINTOKOGIO, LTD., Nagoya (JP)

(72) Inventors: Masanori Shimizu, Toyokawa (JP); Takuro Yamazaki, Toyokawa (JP); Mizuki Okubo, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 847 days.

(21) Appl. No.: 17/789,376

(22) PCT Filed: Nov. 4, 2020

(86) PCT No.: PCT/JP2020/041243
§ 371 (c)(1),
(2) Date: Jun. 27, 2022

(87) PCT Pub. No.: WO2021/192390
PCT Pub. Date: Sep. 30, 2021

(65) Prior Publication Data

US 2023/0035152 A1 Feb. 2, 2023

(30) Foreign Application Priority Data

Mar. 27, 2020 (JP) ................................ 2020-058262

(51) Int. Cl.

| | |
|---|---|
| ***C10K 1/10*** | (2006.01) |
| ***B01D 47/02*** | (2006.01) |
| ***C02F 1/02*** | (2023.01) |
| ***C02F 1/78*** | (2023.01) |

(52) U.S. Cl.
CPC .............. *C10K 1/10* (2013.01); *B01D 47/021* (2013.01); *C02F 1/02* (2013.01); *C02F 1/78* (2013.01)

(58) Field of Classification Search
None
See application file for complete search history.

(56) References Cited

U.S. PATENT DOCUMENTS

| | | | |
|---|---|---|---|
| 2014/0041562 | A1 | 2/2014 | Grubbstrom |
| 2017/0191657 | A1 | 7/2017 | Grubbström |

FOREIGN PATENT DOCUMENTS

| | | | |
|---|---|---|---|
| CN | 102276320 | A | 12/2011 |
| CN | 103328075 | A | 9/2013 |
| CN | 103881761 | A | 6/2014 |
| CN | 105937765 | B | 7/2018 |

(Continued)

OTHER PUBLICATIONS

English translation for Ohara reference (JP 2011099071 A).*

(Continued)

*Primary Examiner* — Jason Lau
(74) *Attorney, Agent, or Firm* — Faegre Drinker Biddle & Reath LLP

(57) ABSTRACT

A gasification system according to an aspect includes a scrubber device to transfer contaminant contained in a flammable gas to cleaning water and discharge the cleaning water containing the contaminant as scrubber wastewater, a heat exchange device to heat the scrubber wastewater to vaporize the contaminant contained in the scrubber wastewater; and a combustion furnace to incinerate the vaporized contaminant, wherein the heat exchange device heats the scrubber wastewater by using heat generated by the combustion furnace.

5 Claims, 1 Drawing Sheet

(56) References Cited

FOREIGN PATENT DOCUMENTS

| | | | |
|---|---|---|---|
| JP | S60-248283 | A | 12/1985 |
| JP | 2008-025876 | A | 2/2008 |
| JP | 2008-200578 | A | 9/2008 |
| JP | 2011-099071 | A | 5/2011 |
| JP | 2012-001645 | A | 1/2012 |

OTHER PUBLICATIONS

English translation for Isemura reference (JP 2012001645 A).*
English-language translation of International Preliminary Report on Patentability (IPRP) dated Oct. 6, 2022 that issued in WO Patent Application No. PCT/JP2020/041243.
Japanese Office Action issued Sep. 10, 2024 in Application No. 2022-509238.
Chaolin Liang, et al., "Green Chemical Engineering and Green Environmental Protection," China Petrochemical Press, 1st Edition, Feb. 28, 2002, p. 158.
Peishi Sun, et al., "Fundamental and Applied Research on Biological Purification Technology for Low-Concentration Organic Waste Gas," Yunnan Science and Technology Press, 1st Edition, Feb. 29, 2004, p. 110.

* cited by examiner

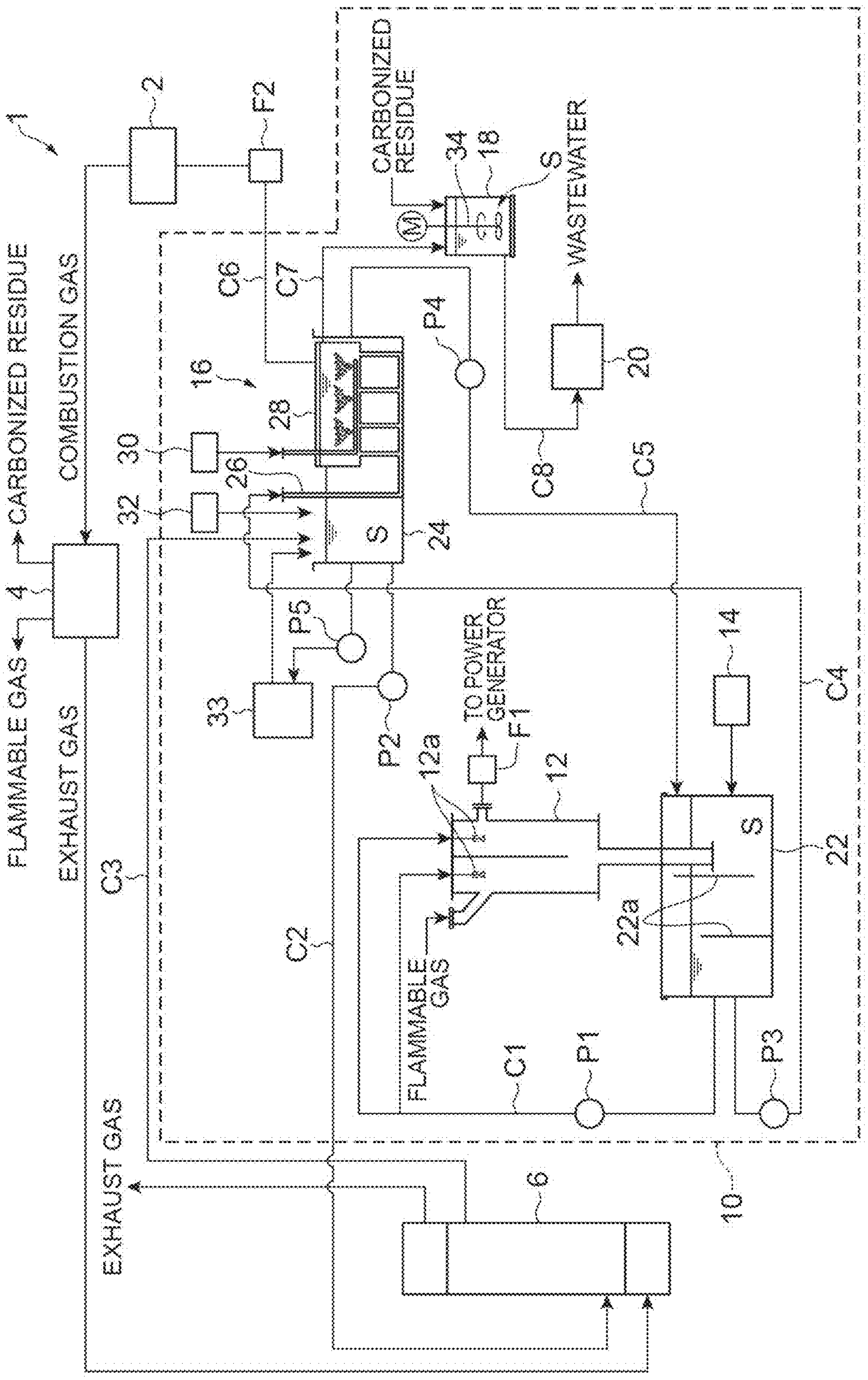
1
2
F2
CARBONIZED RESIDUE
COMBUSTION GAS
FLAMMABLE GAS
EXHAUST GAS
4
C3
C2
C6
C7
CARBONIZED RESIDUE
34
18
S
WASTEWATER
M
16
28
30
26
32
S
24
P4
20
C8
C5
P5
33
P2
TO POWER GENERATOR
F1
12a
12
14
C4
S
22
22a
FLAMMABLE GAS
C1
P1
P3
EXHAUST GAS
6
10

GASIFICATION SYSTEM AND WASTEWATER TREATMENT METHOD

TECHNICAL FIELD

The present disclosure relates to a gasification system and a wastewater treatment method.

BACKGROUND ART

Gasification system that generates flammable gas from biomass fuel or the like have been used. Since the flammable gas generated by the gasification system contains contaminants such as cyanide and organic substance, it is required to remove these contaminants.

As a technique for removing contaminants contained in a flammable gas, for example, a system described in Patent Literature 1 is known. The system described in Patent Literature 1 includes a scrubber that transfers cyanide in a reformed gas to scrubber wastewater, a pH adjustment tank that adjusts pH of the scrubber wastewater, an aeration tank that blows air bubbles into the scrubber wastewater to transfer the cyanide to the gas phase, and a burner that incinerates the cyanide in the gas phase.

CITATION LIST

Patent Literature

Patent Literature 1: Japanese Unexamined Patent Application Publication No 2008-200578

SUMMARY OF INVENTION

Technical Problem

In the system described in Patent Literature 1, a chemical such as sulfuric acid is added to scrubber wastewater to adjust the pH in order to promote vaporization of the cyanide and the like. In this system, since a device for adding the chemical is required, the facility becomes complicated and the treatment cost of the waste water increases.

Accordingly, an object of the present invention is to provide a gasification system and a wastewater treatment method capable of effectively removing contaminants while reducing treatment costs.

Solution to Problem

A gasification system according to an aspect includes a scrubber device to transfer contaminant contained in a flammable gas to cleaning water and discharge the cleaning water containing the contaminant as scrubber wastewater, a heat exchange device to heat the scrubber wastewater to vaporize the contaminant contained in the scrubber wastewater, and a combustion furnace to incinerate the vaporized contaminant, wherein the heat exchange device heats the scrubber wastewater by using heat generated by the combustion furnace.

In the gasification system of the aspect, since the contaminant is vaporized by heating the scrubber wastewater and then incinerated in the combustion furnace, the contaminant contained in the scrubber wastewater can be removed without using a chemical such as a pH adjuster. Further, since the heat generated by the combustion furnace is reused for heating the scrubber wastewater, the energy efficiency of the entire system can be improved. Therefore, the contaminant can be effectively removed while suppressing the treatment cost of the waste water.

The gasification system according to an embodiment may further include a microbubble supply device to supply microbubbles to the scrubber wastewater. Since the contaminant contained in the scrubber wastewater can be decomposed by supplying the microbubbles, the contaminant contained in the scrubber wastewater can be more effectively removed. The microbubble supply device may supply microbubbles of ozone to the scrubber wastewater.

The gasification system according to one embodiment may further include a gasification furnace to generate the flammable gas from the biomass fuel by using heat generated in the combustion furnace, and a boiler to generate hot water by using exhaust heat of the gasification furnace, wherein the heat exchange device heats the scrubber wastewater by using the hot water generated by the boiler. By heating the scrubber wastewater using the hot water generated by the exhaust heat of the gasification furnace, the energy efficiency of the entire system can be improved, and as a result, the treatment cost of the scrubber wastewater can be reduced.

In one embodiment, the heat exchange device may include a hot water tank to store the hot water, a heat exchanger provided in the hot water tank to heat the scrubber wastewater through heat exchange between the hot water and the scrubber wastewater, and a retaining tank to store the heated scrubber wastewater. In this embodiment, the scrubber wastewater can be heated with high energy efficiency by heat exchange between the hot water and the scrubber wastewater.

In one embodiment, the heat exchange device may further include an air diffuser to generate bubbles in the scrubber wastewater in the retaining tank. The vaporization of the contaminant can be accelerated by generating bubbles in the scrubber wastewater to aerate it.

The gasification system according to one embodiment may further include an adsorption reaction device to stir a carbonized residue remaining after the flammable gas is generated from the biomass fuel and the scrubber wastewater to adsorb the contaminant contained in the scrubber wastewater to the carbonized residue. The treatment cost of the contaminant can be further reduced by adsorbing the contaminant using the carbonized residue which is a by-product at the time of generating the flammable gas.

The gasification system according to one embodiment may further include a solid-liquid separator to separate the carbonized residue from the scrubber wastewater treated by the adsorption reaction device. This solid-liquid separator is possible to remove the carbonized residue with contaminant from the scrubber wastewater.

In one embodiment, the combustion furnace may combust the carbonized residue on which the contaminant is adsorbed. By reusing the carbonized residue as a fuel in the combustion furnace, it is possible to improve the energy efficiency of the entire system and further reduce the treatment cost of the contaminant.

A wastewater treatment method according to an aspect includes bringing a flammable gas into contact with cleaning water to transfer contaminant contained in the flammable gas to the cleaning water; and vaporizing the contaminant contained in the scrubber wastewater by heating the scrubber wastewater, which is the cleaning water containing the contaminant, by using heat generated by a combustion furnace; and incinerating the vaporized contaminant in the combustion furnace.

According to the wastewater treatment method of the aspect, it is possible to effectively remove contaminant while reducing the treatment cost of wastewater as described above.

Advantageous Effects of Invention

According to aspects and various embodiments of the present invention, contaminant can be effectively removed while reducing treatment cost.

BRIEF DESCRIPTION OF DRAWINGS

FIG. 1 is a diagram schematically illustrating a gasification system according to an embodiment.

DESCRIPTION OF EMBODIMENTS

Hereinafter, embodiments of the present disclosure will be described with reference to the drawings. In the following description, the same or corresponding elements are denoted by the same reference numerals, and redundant description will not be repeated.

FIG. 1 is a diagram schematically illustrating a gasification system according to an embodiment. The gasification system 1 shown in FIG. 1 produces flammable gas from biomass fuel. The biomass fuel is an organic fuel derived from organisms, and is, for example, a woody biomass fuel including wood, branches, bark, and the like.

As shown in FIG. 1, the gasification system 1 includes a combustion furnace 2, a gasification furnace 4, a boiler 6, and a wastewater treatment system 10. The combustion furnace 2 generates heat for obtaining a flammable gas from biomass fuel. More specifically, the combustion furnace 2 combusts biomass fuel in the furnace to generate combustion gas, and supplies the generated combustion gas to the gasification furnace 4.

The gasification furnace 4 generates the flammable gas by using heat generated in the combustion furnace 2. Biomass fuel for generating the flammable gas is charged into the gasification furnace 4. The gasification furnace 4 generates the flammable gas by heating the biomass fuel in the furnace to about 900° C. and thermally decomposing the biomass fuel using the combustion gas supplied from the combustion furnace 2. The flammable gas generated by the gasification furnace 4 is supplied to the scrubber device 12 described later. On the other hand, an exhaust gas containing exhaust heat of the gasification furnace 4 supplied from the combustion furnace 2 and used for the thermal decomposition of the biomass fuel is supplied to the boiler 6. After the flammable gas is generated from the biomass fuel, a carbonized residue of the biomass fuel remains in the gasification furnace 4. This carbonized residue is discharged from the gasification furnace 4 after generation of the flammable gas.

The boiler 6 heats water with exhaust heat from the gasification furnace 4 to produce hot water. The boiler 6 supplies the generated hot water to a hot water tank 24 described later. The exhaust gas from which waste heat has been recovered by the generation of hot water is released into the air via, for example, an air-cooling device and a filter.

The wastewater treatment system 10 recovers the contaminants contained in the flammable gas into the scrubber wastewater and purifies the scrubber wastewater containing the contaminants. As shown in FIG. 1, the wastewater treatment system 10 includes a scrubber device 12, a microbubble supply device 14, a heat exchange device 16, an adsorption reaction device 18, and a solid-liquid separator 20.

The scrubber device 12 is a wet type cleaning apparatus to remove contaminants contained in the flammable gas. As described above, the flammable gas produced by the gasification furnace 4 is charged into the scrubber device 12. The scrubber device 12 has a plurality of sprinkler 12*a*, and brings cleaning water sprayed from the plurality of sprinkler 12*a* into contact with the flammable gas to transfer contaminants in the flammable gas to the cleaning water. Examples of contaminants transferred to the cleaning water include hydrogen cyanide, benzene, and phenol.

The flammable gas from which the contaminants have been removed by the scrubber device 12 is supplied to a power generator such as a gas engine by the operation of a fan F1, and is used in the power generator as a fuel for power generation. On the other hand, the cleaning water containing contaminants is discharged to a wastewater tank 22 as scrubber wastewater S. In one embodiment, a partition wall 22*a* that defines a flow path for the scrubber wastewater S may be formed inside the wastewater tank 22. The scrubber wastewater S discharged from the scrubber device 12 is supplied to an upstream portion of the flow path formed by the partition wall 22*a*, and flows toward a downstream portion of the flow path. A conduit C1 is connected to the downstream portion of the flow path. The scrubber wastewater S that has reached the downstream portion of the flow path of the wastewater tank 22 is returned to the plurality of sprinkler 12*a* via the conduit C1 by the operation of the pump P1, and is reused as the cleaning water.

The microbubble supply device 14 generates microbubbles and supplies them to the scrubber wastewater S in the wastewater tank 22. The supplied microbubbles supplied from the microbubble supply device 14 will eventually disappear in the scrubber wastewater S. During the generation of the microbubbles, hydroxyl radicals are generated by hydrodynamic cavitation, and contaminants in the scrubber wastewater S are decomposed by the generated hydroxyl radicals. In one embodiment, the microbubbles supplied from the microbubble supply device 14 may be microbubbles of ozone. For example, the microbubble supply device 14 releases fine ozone bubbles having an average particle size of 10 μm to 100 μm into the scrubber wastewater S at the upstream portion of the flow path in the wastewater tank 22. The microbubbles of ozone oxidize and decompose hydrogen cyanide, benzene, phenol, and the like contained in the scrubber wastewater S and reduce contaminants in the scrubber wastewater S.

The Heat exchange device 16 heats the scrubber wastewater S treated by the microbubble supply device 14 to vaporize contaminants contained in the scrubber wastewater S. As shown in FIG. 1, the heat exchange device 16 includes a hot water tank 24, a heat exchanger 26, and a retaining tank 28.

The hot water tank 24 is connected to the boiler 6 via a conduit C2 and a conduit C3. In the hot water tank 24, water supplied from a water supply device 32 is stored. The water stored in the hot water tank 24 is supplied to the boiler 6 via the conduit C2 by the operation of a pump P2. The water supplied to the boiler 6 is heated by the exhaust heat from the gasification furnace 4 to become hot water, and is returned to the hot water tank 24 via the conduit C3. The water circulates between the hot water tank 24 and the boiler 6 in this manner, and thereby, the temperature of water in the hot water tank 24 is maintained at a temperature of, for example, 60° C. to 90° C.

The hot water tank 24 is also connected to the wastewater tank 22 via a conduit C5. A part of the hot water in the hot water tank 24 is supplied to the wastewater tank 22 via the conduit C5 by the operation of a pump P4. As a result, the water level in the wastewater tank 22 is maintained substantially constant. Further, a cooling device 33 is connected to the hot water tank 24. When the temperature in the hot water tank 24 becomes higher than a predetermined temperature, a pump P5 is activated and the hot water in the hot water tank 24 circulates between the hot water tank 24 and the cooling device 33. Thus, the hot water in the hot water tank 24 is cooled.

The heat exchanger 26 is disposed in the hot water tank 24 and is connected to the wastewater tank 22 via a conduit C4. The scrubber wastewater S in the wastewater tank 22 is introduced into the heat exchanger 26 via the conduit C4 by the operation of a pump P3. The scrubber wastewater S introduced into the heat exchanger 26 is heated by heat exchange with the hot water stored in the hot water tank 24. That is, the heat exchange device 16 indirectly utilizes heat generated by the combustion furnace 2 to heat the scrubber wastewater S. The heated scrubber wastewater S is supplied to the retaining tank 28.

The retaining tank 28 is disposed in the hot water tank 24 and stores the scrubber wastewater S heated by the heat exchanger 26. The scrubber wastewater S in the retaining tank 28 is maintained at a temperature of, for example, 80° C. or higher. Here, the boiling point of hydrogen cyanide in scrubber wastewater S is room temperature (25° C.), and the boiling point of benzene is 80° C. Therefore, contaminants including hydrogen cyanide and benzene contained in the scrubber wastewater S are vaporized in the retaining tank 28. The vaporized contaminants are sent to the combustion furnace 2 via a conduit C6 by the operation of a fan F2. The contaminants sent to the combustion furnace 2 are incinerated by the heat of the combustion furnace 2. This reduces the contaminants in the scrubber wastewater S. The heat exchange device 16 may further include an air diffuser 30 that generates air bubbles in the scrubber waters S stored in the retaining tank 28. Generation of air bubbles in the scrubber wastewater S by the air diffuser 30 promotes vaporization of the contaminants.

The retaining tank 28 is connected to the adsorption reaction device 18 via a conduit C7. The scrubber wastewater S from which the contaminants have been vaporized by the retaining tank 28 is sent to the adsorption reaction device 18 via the conduit C7.

The carbonized residue discharged from the gasification furnace 4 is charged into the adsorption reaction device 18. The adsorption reaction device 18 stirs the scrubber wastewater S treated by the heat exchange device 16 and the carbonized residue by the operation of the stirring device 34. As a result, organic substances (for example, tar, benzene, phenol, and the like) contained in the scrubber wastewater S are adsorbed to the carbonized residue, and contaminants in the scrubber wastewater S are further reduced. The scrubber wastewater S treated by the adsorption reaction device 18 is supplied to the solid-liquid separator 20 via a conduit C8. On the other hand, the carbonized residue on which the contaminants have been adsorbed is discharged from the adsorption reaction device 18 and introduced into the combustion furnace 2 as fuel.

The solid-liquid separator 20 separates the carbonized residue from the scrubber wastewater S treated by the adsorption reaction device 18. For example, the solid-liquid separator 20 is a precoat filtration system to recover the particulate carbonized residue remaining in the scrubber wastewater with a filter aid. The scrubber wastewater S from which the carbonized residue has been removed is discharged to the outside of the wastewater treatment system 10.

Next, a wastewater treatment method using the above-described wastewater treatment system 10 will be described. When the flammable gas generated by the gasification furnace 4 is introduced into the scrubber device 12, the scrubber device 12 sprays the cleaning water from the sprinkler 12*a* to bring the flammable gas into contact with the cleaning water to transfer contaminants in the flammable gas to the cleaning water.

Next, the microbubble supply device 14 supplies microbubbles to the scrubber wastewater S discharged from the scrubber device 12. As a result, contaminants in the scrubber wastewater S are oxidized and decomposed. The microbubbles supplied from the microbubble supply device 14 may be microbubbles of ozone.

Next, the scrubber wastewater S in wastewater tank 22 is introduced into the heat exchanger 26 of the heat exchange device 16. The heat exchanger 26 heats the scrubber wastewater S by heat energy of the hot water generated by the combustion gas from the combustion furnace 2, and supplies the heated scrubber waters S to the retaining tank 28. Next, the air diffuser 30 generates air bubbles in the scrubber wastewater S. As a result, contaminants in the scrubber wastewater S are vaporized. Next, the combustion furnace 2 incinerates the vaporized contaminants.

Next, the scrubber wastewater S treated by the heat exchange device 16 is introduced into the adsorption reaction device 18. Then, the adsorption reaction device 18 stirs the scrubber wastewater S treated by the heat exchange device 16 and the carbonized residue discharged from the gasification furnace 4 to absorb contaminants in the scrubber wastewater S into the carbonized residue. Next, the carbonized residue into which the contaminants have been adsorbed is taken out from the adsorption reaction device 18 and charged into the combustion furnace 2. As a result, the carbonized residue is used as fuel of the combustion furnace 2, and the contaminants adsorbed on the carbonized residue are incinerated.

Next, the scrubber wastewater S treated by the adsorption reaction device 18 is introduced into the solid-liquid separator 20. Then, the solid-liquid separator 20 separates the carbonized residue remaining in the scrubber wastewater S from the scrubber wastewater S. Next, the scrubber wastewater S from which the carbonized residue is separated is discharged to the outside of the wastewater treatment system 10.

In the gasification system 1 described above, since the contaminants are vaporized and incinerated by heating the scrubber wastewater S, the contaminants in the scrubber wastewater S can be removed without using chemicals such as a pH adjuster. Further, since the heat generated by the combustion furnace is reused to heat the scrubber wastewater S, the energy efficiency of the entire system can be improved. Therefore, according to the gasification system 1, contaminants can be effectively removed while suppressing the treatment cost of the scrubber wastewater S.

Further, in the gasification system 1, contaminants are adsorbed on the carbonized residue, which is a by-product of the generation of the flammable gas, by the adsorption reaction device 18. Therefore, the treatment cost can be further reduced as compared with a case where activated carbon is used as an adsorbent, for example. Further, since the carbonized residue on which the contaminants are adsorbed is returned to the combustion furnace 2 and reused as fuel, the operation cost of the gasification system 1 can be reduced.

Furthermore, in the gasification system 1, since the scrubber wastewater S is treated in the order of the microbubble supply device 14, the heat exchange device 16, and the adsorption reaction device 18, contaminants contained in the scrubber wastewater S can be removed stepwise. Therefore, it is possible to efficiently remove contaminants in the scrubber wastewater S.

Although the gasification systems according to various embodiments have been described, various modifications can be made without changing the gist of the invention without being limited to the above-described embodiments. For example, in the above-described embodiment, an example in which the woody biomass fuel is used as the biomass fuel has been described, but the flammable gas may be generated from a biomass fuel other than the woody biomass fuel.

In the above-described embodiment, the scrubber wastewater S is treated in the order of the microbubble supply device 14, the heat exchange device 16 and the adsorption reaction device 18, but the microbubble supply device 14, the heat exchange device 16 and the adsorption reaction device 18 may treat the scrubber wastewater S in any order.

REFERENCE SIGNS LIST

1: gasification system, 2: combustion furnace, 4: gasification furnace, 6: boiler, 12: scrubber device, 14: microbubble supply device, 16: heat exchange device, 18: adsorption reaction device, 20: solid-liquid separator, 24: hot water tank, 26: heat exchanger, 28: retaining tank, 30: air diffuser, S: scrubber wastewater.

The invention claimed is:

1. A gasification system comprising:

a scrubber device to transfer contaminant contained in a flammable gas to cleaning water and discharge the cleaning water containing the contaminant as scrubber wastewater;

a heat exchange device to heat the scrubber wastewater to vaporize the contaminant contained in the scrubber wastewater;

a combustion furnace to incinerate the vaporized contaminant;

a gasification furnace to generate the flammable gas from biomass fuel by using heat generated in the combustion furnace; and a boiler to generate hot water by using exhaust heat of the gasification furnace, wherein the heat exchange device heats the scrubber wastewater by using the hot water generated by the boiler, wherein the heat exchange device includes:

a hot water tank to store the hot water;

a heat exchanger provided in the hot water tank to heat the scrubber wastewater through heat exchange between the hot water and the scrubber wastewater; and a retaining tank to store the heated scrubber wastewater.

2. The gasification system of claim 1, wherein the heat exchange device further includes an air diffuser to generate bubbles in the scrubber wastewater in the retaining tank.

3. A gasification system comprising:

a scrubber device to transfer contaminant contained in a flammable gas to cleaning water and discharge the cleaning water containing the contaminant as scrubber wastewater;

a heat exchange device to heat the scrubber wastewater to vaporize the contaminant contained in the scrubber wastewater;

a combustion furnace to incinerate the vaporized contaminant;

a gasification furnace to generate the flammable gas from biomass fuel by using heat generated in the combustion furnace;

a boiler to generate hot water by using exhaust heat of the gasification furnace; and an adsorption reaction device to stir a carbonized residue remaining after the flammable gas is generated from the biomass fuel and the scrubber wastewater to absorb the contaminant contained in the scrubber wastewater to the carbonized residue, wherein the heat exchange device heats the scrubber wastewater by using the hot water generated by the boiler.

4. The gasification system according to claim 3, further comprising a solid-liquid separator to separate the carbonized residue from the scrubber wastewater treated by the adsorption reaction device.

5. The gasification system according to claim 3, wherein the combustion furnace combusts the carbonized residue on which the contaminant is adsorbed.

* * * * *